US012606060B2

(12) United States Patent
Rajput et al.

(10) Patent No.: US 12,606,060 B2
(45) Date of Patent: Apr. 21, 2026

(54) VEHICLE SEAT WITH A LOCKING ELEMENT

(71) Applicant: BROSE FAHRZEUGTEILE SE & CO. KOMMANDITGESELLSCHAFT, COBURG, Coburg (DE)

(72) Inventors: Chetansingh Rajput, Pune (IN); Andreas Pauls, Grub am Forst (DE)

(73) Assignee: BROSE FAHRZEUGTEILE SE & CO. KOMMANDITGESELLSCHAFT, COBURG, Coburg (DE)

( * ) Notice: Subject to any disclaimer, the term of this patent is extended or adjusted under 35 U.S.C. 154(b) by 140 days.

(21) Appl. No.: 18/262,120

(22) PCT Filed: Feb. 19, 2021

(86) PCT No.: PCT/EP2021/054151
§ 371 (c)(1),
(2) Date: Jul. 19, 2023

(87) PCT Pub. No.: WO2022/174916
PCT Pub. Date: Aug. 25, 2022

(65) Prior Publication Data
US 2023/0398909 A1 Dec. 14, 2023

(51) Int. Cl.
*B60N 2/07* (2006.01)
*B60N 2/12* (2006.01)
*B60N 2/14* (2006.01)

(52) U.S. Cl.
CPC ........... *B60N 2/123* (2013.01); *B60N 2/0727* (2013.01); *B60N 2/146* (2013.01)

(58) Field of Classification Search
CPC .... B60N 2/0727; B60N 2/0881; B60N 2/123; B60N 2/146; B60N 2/3065
See application file for complete search history.

(56) References Cited

U.S. PATENT DOCUMENTS 5,820,216 A    10/1998  Feuillet
6,149,237 A  *  11/2000  Morishita ............ B60N 2/3065
                                           297/341

(Continued)

FOREIGN PATENT DOCUMENTS

CN      104619550 A    5/2015
CN      108349412 A    7/2018
(Continued)

OTHER PUBLICATIONS

United States Patent and Trademark Office, Non Final Office Action Issued in U.S. Appl. No. 18/262,133, filed Jun. 3, 2025, 12 pages.
(Continued)

*Primary Examiner* — Timothy J Brindley
(74) *Attorney, Agent, or Firm* — McCoy Russell LLP

(57) ABSTRACT

It is provided a vehicle seat comprises a seat part having a seat part element, a basis comprising a first rail, a longitudinal adjustment device formed by at least the first rail and a second rail longitudinally adjustable with respect to one another, and a lever by means of which the seat part element is connected to the basis movably relative to the basis. It is provided that the lever has a section that is adapted to cooperate with a locking element, wherein the locking element is rotatably mounted on the basis, configured to operate a locking device of the longitudinal adjustment device to unlock the first rail with respect to the second rail, and configured to engage with a latch to restrict a movement of the first rail with respect to the second rail.

12 Claims, 5 Drawing Sheets

(56) References Cited

U.S. PATENT DOCUMENTS

| | | | |
|---|---|---|---|
| 10,239,427 B2 | 3/2019 | Keyser et al. | |
| 10,549,670 B1 | 2/2020 | Smith | |
| 11,453,313 B2 * | 9/2022 | Chen ........................ | B60N 2/08 |
| 2007/0278814 A1 | 12/2007 | Kojima | |
| 2008/0309136 A1 | 12/2008 | Kojima et al. | |
| 2014/0353454 A1 * | 12/2014 | Yamada ............... | B60N 2/0715 |
| | | | 248/429 |
| 2015/0321583 A1 * | 11/2015 | Sasaki ..................... | B60N 2/07 |
| | | | 297/341 |
| 2018/0194251 A1 | 7/2018 | Kreuels et al. | |
| 2019/0126785 A1 * | 5/2019 | Sasaki .................. | B60N 2/0715 |
| 2019/0143851 A1 | 5/2019 | Handigol et al. | |
| 2019/0152352 A1 | 5/2019 | Handigol et al. | |
| 2019/0225129 A1 * | 7/2019 | Kish ....................... | B60N 2/165 |
| 2019/0351792 A1 | 11/2019 | Kaemmerer | |
| 2019/0366880 A1 | 12/2019 | Dill et al. | |
| 2020/0247279 A1 * | 8/2020 | Hattori ................. | B60N 2/0881 |
| 2020/0391621 A1 | 12/2020 | Jung et al. | |

FOREIGN PATENT DOCUMENTS

| | | | | | |
|---|---|---|---|---|---|
| CN | 207916632 U | 9/2018 | | | |
| CN | 109689425 A | 4/2019 | | | |
| CN | 109996699 A | 7/2019 | | | |
| DE | 1405227 A1 | 12/1968 | | | |
| DE | 3608827 A1 | 10/1987 | | | |
| DE | 10020923 A1 | 12/2001 | | | |
| DE | 102010040424 A1 | 5/2011 | | | |
| DE | 102016225843 A1 | 2/2018 | | | |
| DE | 102004057106 B4 | 3/2018 | | | |
| DE | 102019101551 A1 | 7/2019 | | | |
| EP | 0029997 A1 | 6/1981 | | | |
| EP | 2363316 A1 | 9/2011 | | | |
| EP | 2028039 B1 | 10/2015 | | | |
| FR | 1182137 A | 6/1959 | | | |
| FR | 2376008 A1 | 7/1978 | | | |
| FR | 2580914 A1 | * | 10/1986 | | |
| FR | 2882005 A1 | * | 8/2006 | .......... | B60N 2/0818 |
| FR | 2917679 A1 | 12/2008 | | | |
| GB | 1540359 A | 2/1979 | | | |
| JP | 2008247179 A | 10/2008 | | | |
| WO | 2014048681 A1 | 4/2014 | | | |
| WO | 2014077390 A1 | 5/2014 | | | |
| WO | WO-2017173316 A1 | * | 10/2017 | .......... | B60N 2/0806 |
| WO | WO-2019096774 A2 | * | 5/2019 | .......... | B60N 2/0232 |
| WO | 2019201973 A1 | 10/2019 | | | |
| WO | WO-2021214127 A1 | * | 10/2021 | ......... | B60N 2/01583 |

OTHER PUBLICATIONS

Korean Intellectual Property Office, Office Action Issued in Application No. 10-2023-7029369, Mar. 14, 2025, 10 pages. (Submitted with English Summary).

Korean Intellectual Property Office, Notice of Allowance Issued in Application No. 10-2023-7029369, Oct. 15, 2025, 5 pages. (Submitted with Partial Translation).

China National Intellectual Property Administration, Office Action and Search Report Issued in Application No. 202180093462.0, Dec. 22, 2025, 13 pages. (Submitted with Partial Translation).

China National Intellectual Property Administration, Office Action and Search Report Issued in Application No. 202180093482.8, Dec. 26, 2025, 14 pages. (Submitted with Partial Translation).

* cited by examiner

FIG 4C
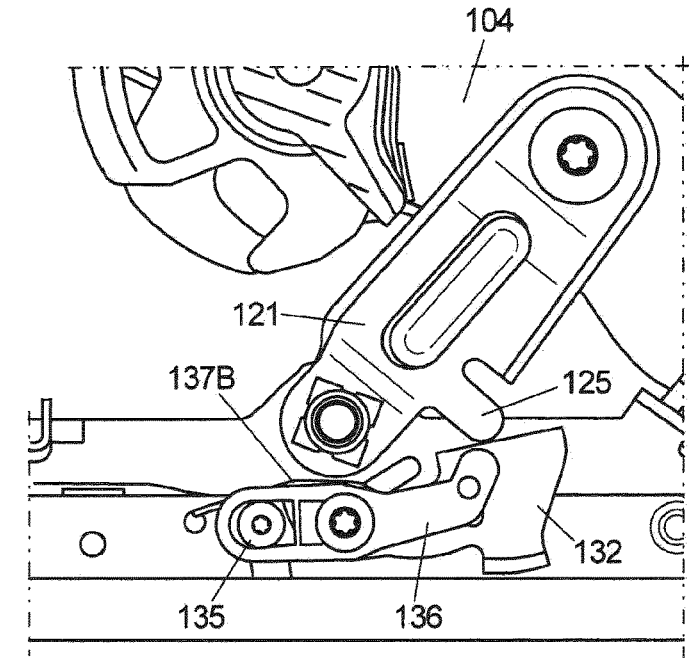
FIG 4D
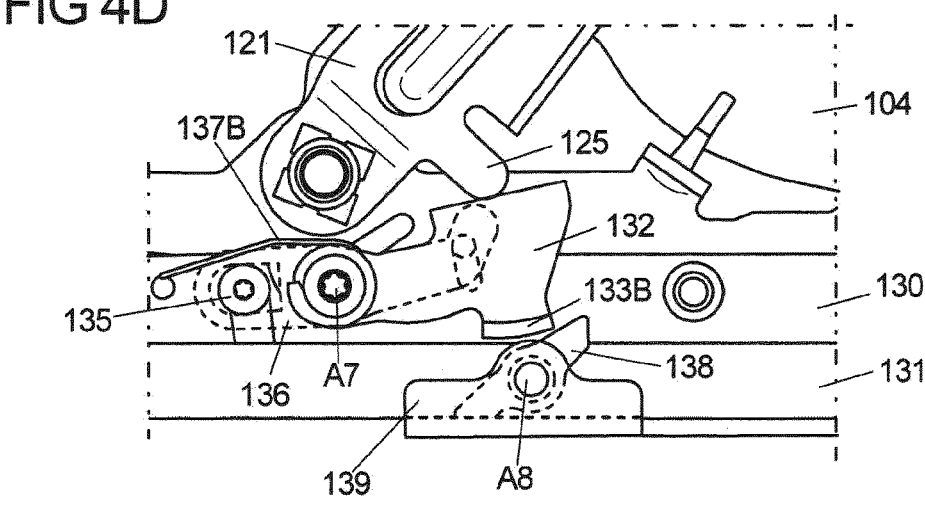
FIG 4E

VEHICLE SEAT WITH A LOCKING ELEMENT

CROSS REFERENCE TO RELATED APPLICATIONS

The present application is a U.S. National Phase of International Application No. PCT/EP2021/054151 entitled "VEHICLE SEAT WITH A LOCKING ELEMENT," and filed on Feb. 19, 2021. The entire contents of the above-listed applications are hereby incorporated by reference for all purposes.

BACKGROUND

The proposed solution relates to a vehicle seat.

Such a vehicle seat comprises a seat part having a seat part element, a basis comprising a first rail, a longitudinal adjustment device formed by at least the first rail and a second rail longitudinally adjustable with respect to one another, and a lever by means of which the seat part element is connected to the basis movably relative to the basis.

A vehicle seat of this kind is described in DE 10 2019 101 551 A1. Therein a lock is mounted on a lever to lock the vehicle seat in the seatable use position. The lock can be released to move the vehicle seat to assume an easy-entry position as a functional position. In the easy-entry position, the seat part and a backrest are moved forward to facilitate an entry of passengers to a row of vehicle seats behind the vehicle seat.

Typically, vehicle seats as the known vehicle seat described above are prone to unintended misuse. For example, when a vehicle with the vehicle seat is parked on a steep street, the vehicle seat may tend to move back from the easy-entry position into the seatable use position with the danger for an occupant to become trapped. When the vehicle seat is adjustable and/or can be moved into more than one functional position, such as the easy-entry position and a fold-flat position, there can be a danger that while the seat is in one functional position, a user activates the other function. Depending on the construction of the vehicle seat this may, again, bear the danger to trap the user and/or damage parts of the vehicle seat. Usually, corresponding countermeasures require a complex construction.

SUMMARY

It is an object underlying the proposed solution to provide an improved vehicle seat.

This object is solved by a vehicle seat with features as described herein.

Therein it is provided that the lever has a section that is adapted to cooperate with a locking element, wherein the locking element is rotatably mounted on the basis, configured to operate a locking device of the longitudinal adjustment device to unlock the first rail with respect to the second rail, and configured to engage with a latch to restrict a movement of the first rail with respect to the second rail.

This allows an improved control of the vehicle seat with a particularly simple construction. In turn, this allows to mitigate possible effects of a misuse of the vehicle seat. Further, an additional use for the lever is provided. The lever itself may control movement of components of the vehicle seat. This also allows to avoid accidental misuse of vehicle seat, and particularly to avoid that the vehicle seat or components thereof unintendedly move. The first rail may be an upper rail and the second rail may be a lower rail. For example, at least the seat part element is supported on the basis by means of the lever, and when an occupant occupies the vehicle seat in the seatable use position, a weight force of the occupant is transmitted via the seat part into the lever, and from the lever into the basis.

The vehicle seat comprises a kinematics arrangement comprising the lever. The vehicle seat may be configurable, by means of the kinematics arrangement, in at least one seatable use position and in at least one functional position. This allows a flexible use of the vehicle seat. Optionally, the kinematics arrangement comprises a four-bar linkage. The four-bar linkage may comprise the basis, the lever, another lever, and the seat part. Four-bar linkages allow very high stabilities and can precisely define kinematics of the seat part.

The section of the lever may be adapted to cooperate with the locking element in the at least one functional position and may be spaced apart from the locking element in the at least one seatable use position.

For example, the at least one functional position comprises the easy-entry position and/or the fold-flat position. The vehicle seat defines a design seating position with a front and a back in the view of an occupant occupying the vehicle seat in the design position. E.g., a backrest of the vehicle seat is arranged at the back or rear side of the vehicle seat, so that the occupant can lean back against it. Many vehicles comprise more than one row of vehicle seats, e.g., two or three rows. Some vehicles have two (or three) rows of vehicle seats, but only one (or two) doors per side. To facilitate entry of occupants to a row of vehicle seats behind the row with the vehicle seat described herein, the vehicle seat, or at least parts thereof, may be moved, and thus the vehicle seat configured, towards the front, i.e., forward, in the easy-entry position. Since the kinematics arrangement carries the seat part, the seat part is moved forward and a particularly comfortable entry to the next row can be provided.

For example, starting from the seatable use position, rotation of the lever of the kinematics arrangement may first unlock the locking device of the longitudinal adjustment device by cooperation of the section of the lever with the locking element, and then moves the locking element in a locking position for locking engagement with the latch. The longitudinal adjustment device allows a longitudinal adjustment of the vehicle seat in the seatable use position and/or a longitudinal displacement to assume an easy-entry position. This multi-stage movement may be effected after unlocking just one lock, e.g. a lock that releasably locks the seat part element to the upper rail.

It may be provided that by longitudinal adjustment of the first rail with respect to the second rail the locking element (in the locking position) can snap behind the latch to lock the first rail with respect to the second rail. This allows a particularly simple use.

The locking element and the latch may be arranged so as to lock the first rail with respect to the second rail at a forward end position of the first rail relative to the second rail. This allows to secure the vehicle seat in a position allowing an easy entry, and an improved protection against clamping, e.g., of the feet of a user behind the vehicle seat.

For example, the latch is rotatably mounted on or at the second rail, e.g., to facilitate a smooth locking. For example, the latch is rotatably mounted on a part being fixed to the second rail and/or with respect to the second rail.

The locking device of the longitudinal adjustment device may be movable (e.g., with a translational movement) relative to the latch. For example, the locking device is mounted on the first rail. The distance between the locking device and the latch may be adjustable, e.g., by moving the first rail relative to the second rail.

The locking element may be rotatable with respect to the basis into a locking position for locking engagement with the latch (e.g., in the easy-entry position), and into a releasing position to disengage from the latch. This allows to releasably secure the vehicle seat in the easy-entry position. Thus, to move the vehicle seat into the easy-entry position, the seat part may be swiveled forward using the kinematics arrangement, and then longitudinally moved forward until it is locked by the locking element and the latch.

The locking element may be configured to operate the locking device of the longitudinal adjustment device via a rotatable rocker. The locking element and the rocker may be rotatable about the same pivot axis. The locking element may comprise a slot engaged by a pin of the rocker. The rocker may be rotated by the locking element and/or by a manual release bar.

Optionally, the latch is pre-tensioned by means of a spring, e.g., into a locking position. This allows to easily engage with the locking element.

The section of the lever may be adapted to cooperate with the locking element by rotating the locking element against a spring force. This allows to make sure that when no external force is applied, the locking element does not unlock the first rail with respect to the second rail.

BRIEF DESCRIPTION OF THE DRAWINGS

The previously mentioned and other advantages of the present solution will be apparent to those skilled in the art upon consideration of the following specification and the attached drawings. Therein:

FIGS. 4A-4E show various stages of one of the levers of the kinematics arrangement and a locking device of the vehicle seat during a transition of the vehicle seat from the seatable use position into the easy-entry position.

DETAILED DESCRIPTION

Figure 1:
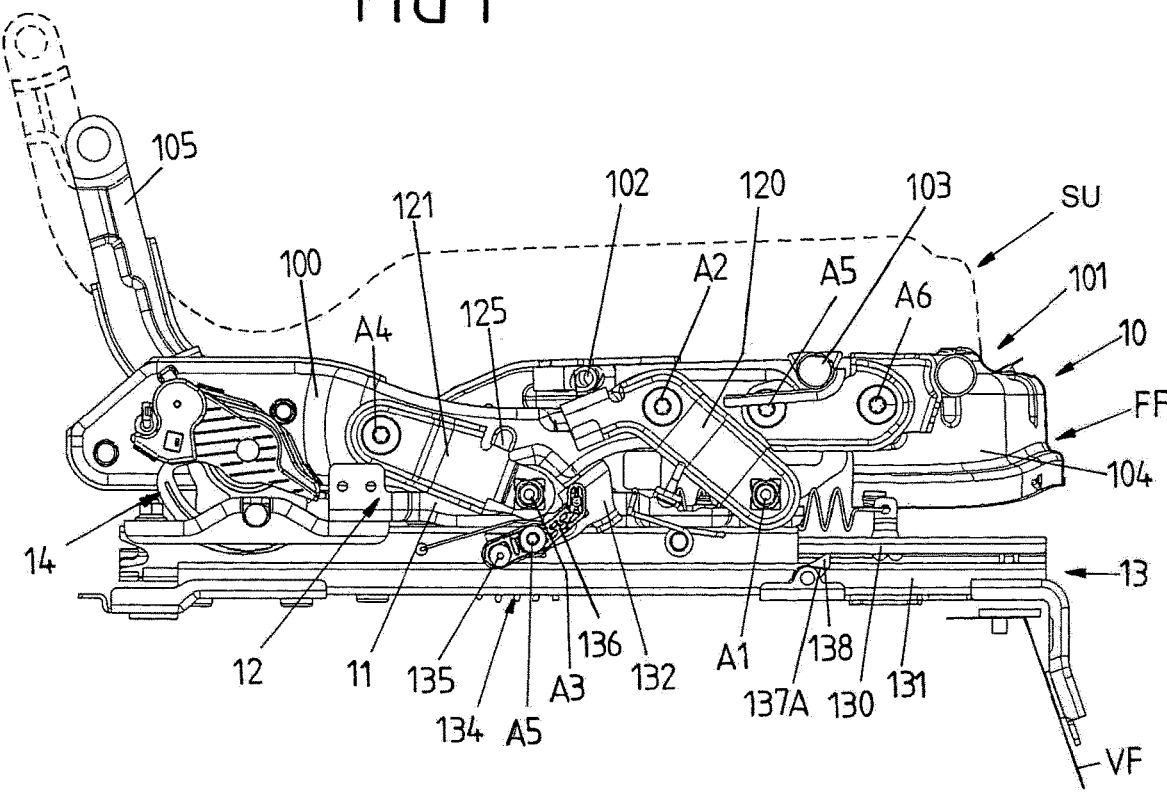
FIG. 1 shows a seat part of a vehicle seat in a fold-flat position.

FIG. 1 is a cross-sectional view of a vehicle seat 1, wherein an inner left side of the vehicle seat 1 is shown. The vehicle seat 1 also comprises a corresponding right side which may comprise, e.g., identical or mirror inverted parts compared to the left side.

Generally, the vehicle seat 1 comprises a seat part 10 whereon an occupant may take a seat, a basis 11 that supports the seat part 10, and a kinematics arrangement 12 that movably connects the seat part 10 to the basis 11. The vehicle seat 1 further comprises a longitudinal adjustment device 13 that allows a longitudinal displacement of the seat part 10 with respect to a vehicle floor VF. The vehicle seat 1 is mountable, and mounted, on the vehicle floor VF by means of the longitudinal adjustment device 13.

Figure 5:
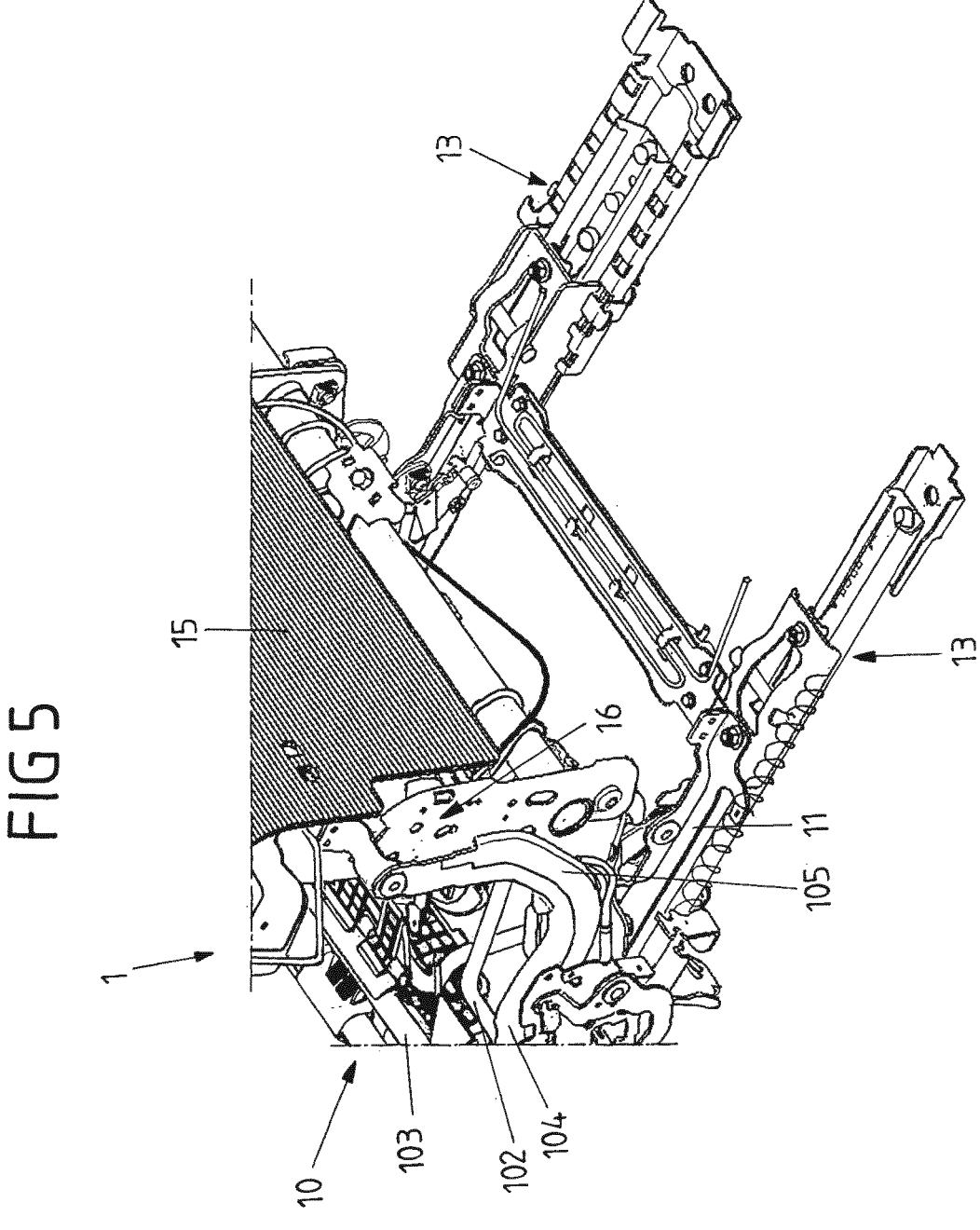
FIG. 5 shows a rear view of the vehicle seat in the easy-entry position.

The vehicle seat 1 further comprises a lock 14 that releasably locks the seat part 10 with the longitudinal adjustment device 13, and a backrest 15 which is not shown in FIG. 1 but visible in FIG. 5. A pair of recliners 16 (see FIG. 5) connects the seat part 10 with the backrest 15 and allows an adjustment of the inclination of the backrest 15 relative to the seat part 10. The backrest 15 is mounted on the seat part 10. Therefore, a movement of the seat part 10 relative to the vehicle floor VF also moves the backrest 15 with respect to the vehicle floor. VF.

The vehicle seat 1 can be adjusted to assume one of several positions. Particularly, the vehicle seat 1 can be configured in several seatable use positions. One seatable use position SU is shown with dashed lines in FIG. 1. In the seatable use positions SU, an occupant may take a seat in the vehicle seat 1, i.e., the seatable use positions SU are designed for seating. The different seatable use positions SU may differ among one another by the inclination of the backrest 15 relative to the seat part 10, by the longitudinal adjustment position of the longitudinal adjustment device 13 and the like.

Further, the vehicle seat 1 can be configured in an easy-entry position EE. In the present example, the vehicle seat can be configured in one of two functional positions, namely in a fold-flat position FF, shown in FIG. 1 with solid lines, and in the easy-entry position EE, shown in FIG. 2. In other words, the vehicle seat 1 provides a fold-flat function and an easy-entry function. It is noted, however, that the fold-flat function is optional.

In the following, first the optional fold-flat function will be described with reference mainly to FIG. 1, and thereafter the easy-entry function will be described with reference to FIG. 2, and FIGS. 4A-4E.

The seat part 10 of the vehicle seat 1 comprises two seat part elements 100 (one on each side, one of which being shown in FIG. 1) and a seat pan 101. The following description of the seat part element 100 visible in FIG. 1 correspondingly applies to the other seat part element of the vehicle seat 1, and the same holds for the components of the kinematics arrangement 12. The (each) seat part element 100 is supported on the basis 11 by means of two levers of the kinematics arrangement 12 which for ease of reference are referred to as a first easy-entry lever 120 and a second easy entry lever 121. The first easy-entry lever 120 is arranged in front of the second (rear) easy-entry lever 121. The first easy-entry lever 120 is pivotably mounted on the basis 11 by means of a pivot axis A1. The seat part element 100 is pivotably mounted on the first easy-entry lever 120 by means of a pivot axis A2. The second easy-entry lever 121 is pivotably mounted on the basis 11 by means of a pivot axis A3. The seat part element 100 is pivotably mounted on the second easy-entry lever 121 by means of a pivot axis A4.

Together, the basis 11, the easy-entry levers 120, 121 and the seat part element 100 form a four-bar linkage. Each of the easy-entry levers 120, 121 is formed in one piece.

The seat pan 101 comprises two side parts 104 (one of which being shown in FIG. 1) that are connected with one another by several cross-bars 102, 103. The seat pan 101 is adapted to support a seat cushion. The seat pan 101 is supported by the seat part elements 100. At a front portion, the seat pan 101 is movably connected with the seat part element 100 by means of a lever of the kinematics arrangement 12 that in the following is referred to as fold-flat lever 122. The fold-flat lever 122 is pivotably connected with the seat part element 100 by means of a pivot axis A5, and is pivotably connected with the seat pan 101 by means of another pivot axis A6. At a rear end, the seat pan 101 comprises an arm 105 (on each of the left and right sides). The arms 105 are pivotably connected to the backrest 15 spaced apart from (above) a reclining axis of the recliners 16 (see FIG. 5). Thus, folding the backrest 15 forward (backward) pivots the fold-flat lever 122 forward (backward). As a result, the seat pan 101 is moved forward and lowered into the fold-flat position FF shown in FIG. 1 when the backrest is folded forward. This allows to fold the backrest 15 into a horizontal or almost horizontal arrangement, e.g., to serve as a table and/or to increase a cargo space.

In the seatable use position SU and in the fold-flat position FF, the lock 14 is locked.

The fold-flat function is activated in the seatable use position SU by folding the backrest 15 on the seat part 10, e.g., by releasing the recliners 16, and folding the backrest 15 manually, or by using an actuator device.

The longitudinal adjustment device 13 comprises an upper rail 130 and a lower rail 131. The upper rail 130 is longitudinally adjustably guided on the lower rail 131. The basis 11 is fixed to the upper rail 130 (alternatively, the upper rail 130 serves as the basis 11). The lower rail 131 is fixed to the vehicle floor VF.

Figure 2:
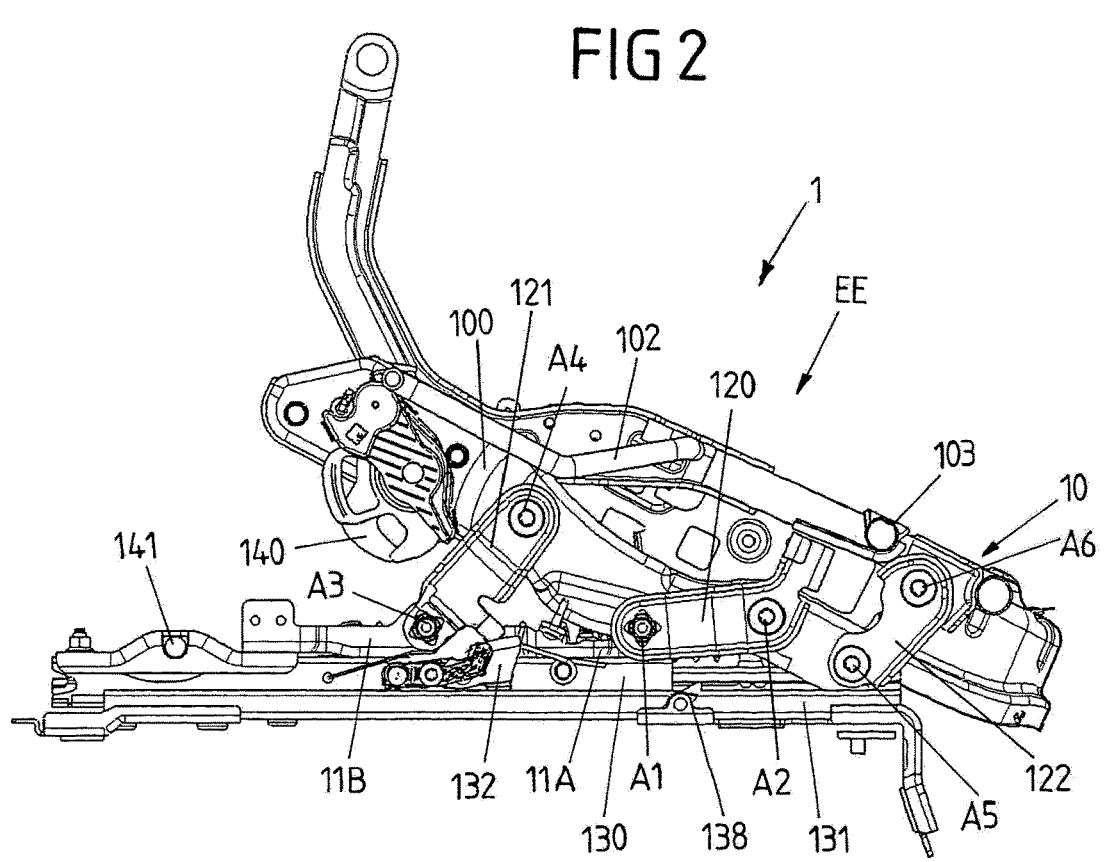
FIG. 2 shows the seat part of the vehicle seat in an easy-entry position.
Figure 3:
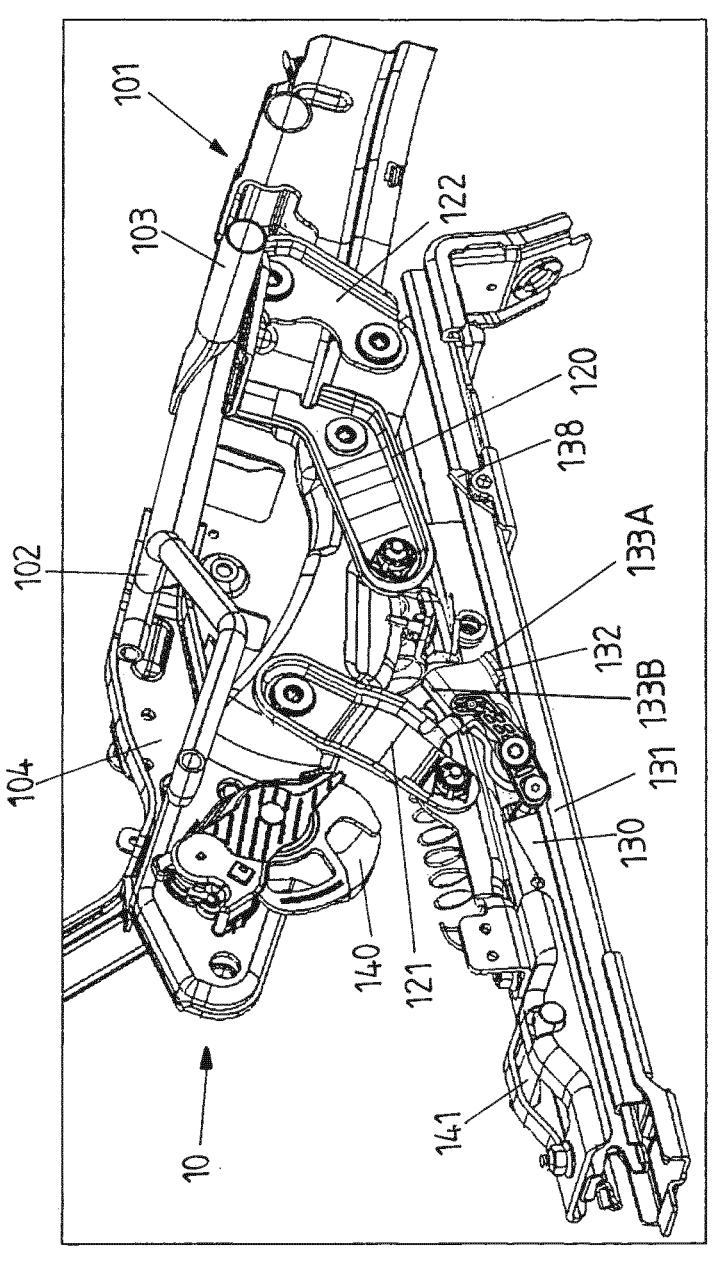
FIG. 3 shows a perspective view of the seat part of the vehicle seat in the easy-entry position.

FIGS. 2 and 3 show the vehicle seat in the easy-entry position EE. Therein, the lock 14 is released, i.e., a hook 140 mounted on the seat part element 100 is disengaged from a pin 141 mounted on the upper rail 130 of the longitudinal adjustment device 13. This allows a movement of the seat part 10 (and backrest 15) relative to the basis 11 by means of the kinematics arrangement 12. Starting from the seatable use position SU, after releasing the lock 14, the seat part 10 and backrest 15 can be moved forward, wherein the easy-entry levers 120, 121 pivot forward around their pivot axes A1, A3 on the basis 11. Thus, not only the backrest is folded forward, but also the seat part is moved forward in order to allow a particularly easy entry into a row of seats behind the vehicle seat 1.

The easy-entry function is activated in the seatable use position SU by unlocking the lock 14.

Turning now to FIGS. 4A to 4E, details of the second easy-entry lever 121 will be described.

Notably, the second easy-entry lever 121 has a section 125 that is adapted to cooperate with a locking element 132 that will be described below, wherein the locking element 132 (a) is rotatably mounted on the basis 11, (b) is configured to operate a locking device 134 of the longitudinal adjustment device 13 to unlock the upper rail 130 with respect to the lower rail 131, and (c) is configured to engage with a latch 138 to restrict, e.g., block, a movement of the upper rail 130 with respect to the lower rail 131.

The section 125 of the second easy-entry lever 121 laterally protrudes from the remainder of the second easy-entry lever 121. Specifically, the section 125 protrudes at a position between the pivot axes A3, A4 of the second easy-entry lever 121. The section 125 is arranged closer to the pivot axis A3 of the second easy-entry lever 121 at the basis 11 than to the pivot axis A4 of the second easy-entry lever 121 at the seat part element 100.

The locking element 132 is pivotably mounted on the upper rail 130 by means of a pivot axis A7. A rocker 136 is also pivotably mounted on the upper rail 130 at the pivot axis A7. The rocker 136 is in engagement with a bolt 135 being guided in a slot of the upper rail 130. The bolt 135 is fixed to a locking device 134 that releasably locks the upper rail 130 with the lower rail 131. In the locked position, teeth of the locking device 134 engage holes in the lower rail 131. In the unlocked position, the teeth are removed from the holes. By rotation of rocker 136 the bolt 135 may be lifted or lowered so as to unlock, or lock, respectively, the locking device 134. A manual handle or release bar (which may be referred to as towel bar) may be adapted to rotate the rocker for a longitudinal adjustment of the vehicle seat 1.

A pin of the rocker 136 engages a slot in the locking element 132, so that the rocker 136 may be rotated from the locking position into the unlocking position without rotating the locking element 132. On the other hand, when the locking element 132 is rotated from the locking position into the unlocking position, the end of the slot and the pin collide, and the rocker 136 is rotated from the locking position into the unlocking position together with the locking element 132.

A spring 137B pretensions the locking element 132 into the locking position.

Figure 4A:
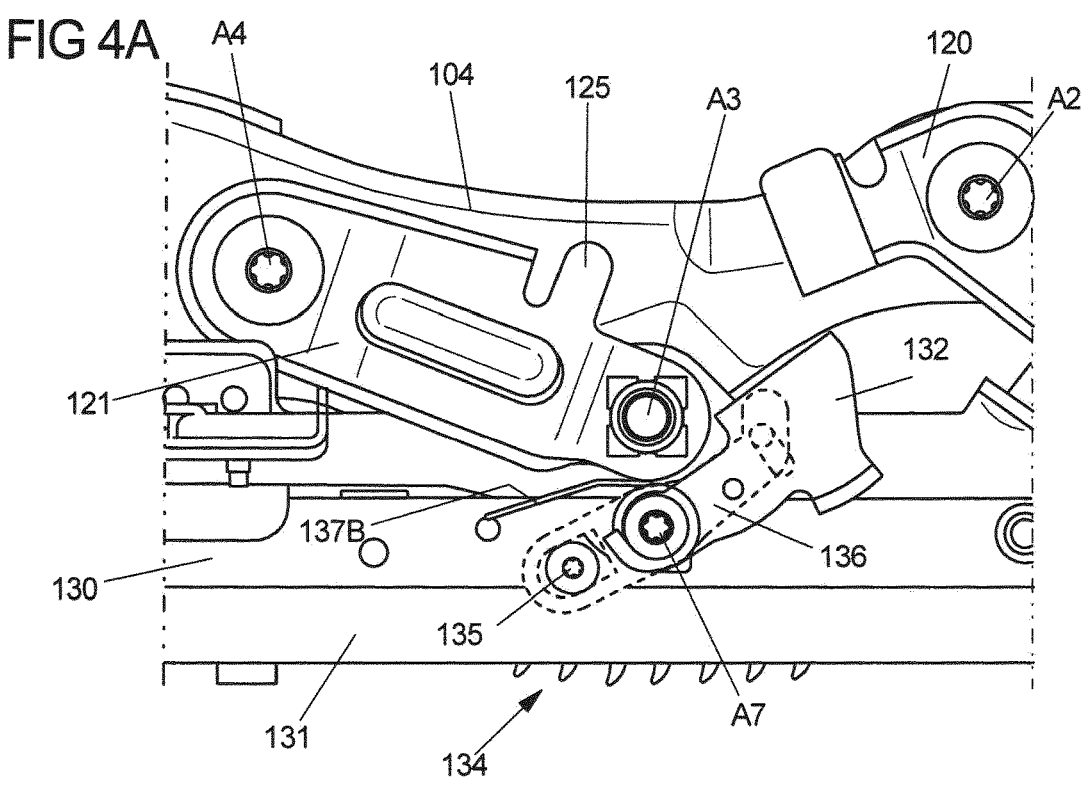
Figure 4B:
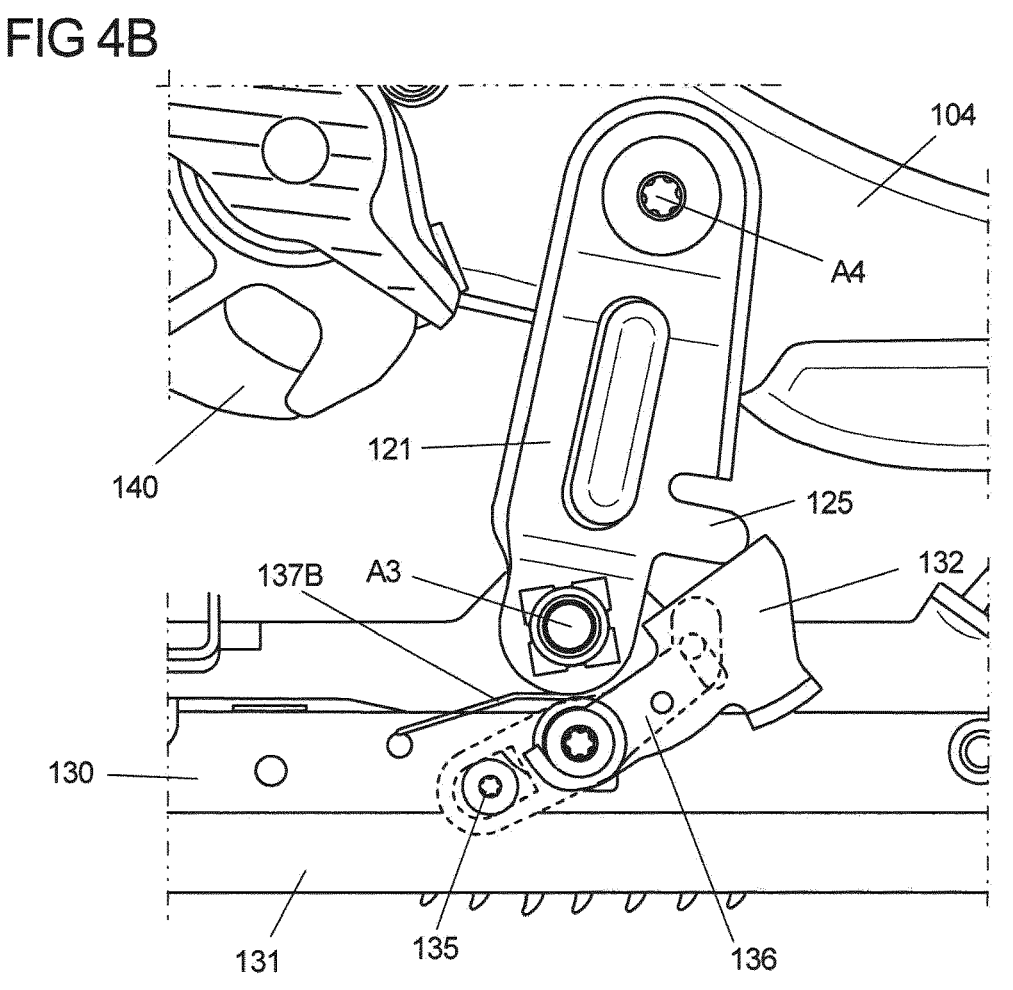

FIG. 4A shows the seatable use position SU, FIG. 4B shows an intermediate position, and FIGS. 4C to 4E show the easy-entry position of the seat part 10 with respect to the basis 11 at different longitudinal positions of the upper rail 130 with respect to the lower rail 131.

When the vehicle seat 1 is transferred from the seatable use position SU into the easy-entry position EE, after unlocking the lock 14 and rotating the easy-entry levers 120, 121 forward, the section 125 of the second easy-entry lever 121 makes contact with the locking element 132, see FIG. 4B. To provide an enlarged contact surface the locking element 132 comprises a flange 133A to be contacted by the section 125 of the second easy-entry lever 121 (see particularly FIG. 3).

By moving the easy-entry levers 120, 121 further forward the section 125 of the second easy entry lever 121 presses the locking element 132 (against the force of the spring 137B) so as to lift the bolt 135 in its slot and release the locking device 134, see FIG. 4C. Now the kinematics arrangement 12 and the seat part 10 with respect to the basis 11 are arranged in the easy-entry position EE. In order to even further clear a space for an occupant to enter behind the vehicle seat 1, the vehicle seat 1 may be adjusted longitudinally forward by means of the unlocked longitudinal adjustment device 13.

At a forward position a latch 138 is arranged at the lower rail 131, see particularly FIGS. 1, 2, 3 and 4D. The latch 138 is pivotably mounted at the lower rail 131, more specifically, on a bracket 139 fixed to the lower rail 131, by means of a pivot axis A8. The latch 138 is pre-tensioned by a spring 137A (see, e.g., FIG. 1) into a locking position shown e.g., in FIGS. 4D and 4E. In the locking position, the latch 138 of the example shown has one part that rests against the bracket 139. Particularly, the latch 138 has a locking surface and a lead-in chamfer that are arranged so that the locking element 132 in the position releasing the locking device 134, may glide along the lead-in chamfer so as to rotate the latch 134 against the force of the spring 137A. As soon as a locking edge of the locking element 132 has been longitudinally moved beyond the lead-in chamfer, the latch 134 snaps back into its locking position and comes into locking engagement with the locking edge of the locking element 132. For an improved reliability the locking element 132 comprises a flange 133B (opposite the flange 133A for the section 125 of the second easy-entry layer 121 described above). The flange 133B forms the locking edge at least partially.

The locking position shown in FIG. 4E may be the foremost position of the upper rail 130 with respect to the lower rail 131.

In the locked position shown in FIG. 4E the upper rail 130 is locked against being moved backwards with respect to the lower rail 131 by the cooperation of the second easy-entry lever 131 with the other component, namely the locking element 132. As a result, the (e.g., foremost) easy-entry position EE is locked against an unintended movement of the seat part 10 and backrest 15 backwards, e.g., due to a misuse or when the vehicle is positioned on an inclined street. This can improve the comfort of the entry into a back row, and may reduce the risk for an occupant to become trapped or clamped, particularly with respect to his or her feet in the region of the read ends of the lower guide rails 131 of the vehicle seat 1, see FIG. 5.

When moving the vehicle seat 1 from the locked easy-entry position EE back into the seatable use position SU, first the seat part 10 is moved (e.g., manually) backwards so as to pivot the easy-entry levers 120, 121. This releases the section 125 of the second easy-entry lever 121 from the locking element 132. Due to the spring force the locking element 132 is rotated to disengage from the latch 138. The bolt 135 may be held in the unlocked position by a memory device that locks in the previous longitudinal adjustment position before the activation of the easy-entry function, or unlocked manually.

The use of the locking element 132 and latch 138 is particularly simple, modular and may easily added to existing designs. A locking element 132 and latch 138 may be arranged on both sides of the vehicle seat 1, i.e., on both longitudinal adjustment devices 13. Alternatively, the locking element 132 and latch 138 may only be arranged on one side, e.g., on the (inner) side of the vehicle seat 1 facing the most adjacent door of the vehicle. This arrangement allows an improved protection against misuse and is hardly visible.

LIST OF REFERENCE NUMERALS

1 vehicle seat
10 seat part
100 seat part element
101 seat pan
102 cross bar
103 cross bar
104 side part
105 arm
11 basis
12 kinematics arrangement
120 (first) easy-entry lever
121 (second) easy-entry lever
122 fold-flat lever
125 section
13 longitudinal adjustment device
130 upper rail (first rail)
131 lower rail (second rail)
132 locking element
133A, 133B flange
134 locking device
135 bolt
136 rocker
137A, 137B spring
138 latch
139 bracket
14 lock
140 hook
141 pin
15 backrest
16 recliner
A1-A8 pivot axis
VF vehicle floor
EE easy-entry position
FF fold-flat position
SU seatable use position

The invention claimed is:

1. A vehicle seat, comprising:
a seat part having a seat part element,
a basis comprising a first rail,
a longitudinal adjustment device formed by at least the first rail and a second rail longitudinally adjustable with respect to one another, and
a lever by means of which the seat part element is connected to the basis movably relative to the basis,
wherein the lever has a section that is adapted to cooperate with a locking element, wherein the locking element is rotatably mounted on the basis, configured to operate a locking device of the longitudinal adjustment device to unlock the first rail with respect to the second rail, and configured to engage with a latch to restrict a movement of the first rail with respect to the second rail,
wherein the locking element and the latch are arranged to lock the first rail with respect to the second rail at a forward end position of the first rail relative to the second rail.

2. The vehicle seat according to claim 1, further comprising a kinematics arrangement comprising the lever, wherein the vehicle seat is configurable, by means of the kinematics arrangement, in at least one seatable use position and in at least one functional position.

3. The vehicle seat according to claim 2, wherein the section of the lever is adapted to cooperate with the locking element in the at least one functional position and does not cooperate with, particularly is spaced apart from, the locking element in the at least one seatable use position.

4. The vehicle seat according to claim 2, wherein the at least one functional position comprises an easy-entry position.

5. The vehicle seat according to claim 2, wherein, starting from the seatable use position, rotation of the lever of the kinematics arrangement first unlocks the locking device of the longitudinal adjustment device by cooperation of the section of the lever with the locking element, and then moves the locking element in a locking position for locking engagement with the latch.

6. The vehicle seat according to claim 1, wherein by longitudinal adjustment of the first rail with respect to the second rail the locking element in the locking position can snap behind the latch to lock the first rail with respect to the second rail.

7. The vehicle seat according to claim 1, wherein the latch is rotatably mounted on the second rail.

8. The vehicle seat according to claim 1, wherein, in an unlocked position, the locking device of the longitudinal adjustment device is movable relative to the latch by moving the first rail relative to the second rail.

9. The vehicle seat according to claim 1, wherein the locking element is rotatable with respect to the basis into a locking position for locking engagement with the latch, and into a releasing position to disengage from the latch.

10. The vehicle seat according to claim 1, wherein the locking element is configured to operate the locking device of the longitudinal adjustment device via a rotatable rocker.

11. The vehicle seat according to claim 1, wherein the latch is pre-tensioned by means of a spring.

12. The vehicle seat according to claim 1, wherein the section of the lever is adapted to cooperate with the locking element by rotating the locking element against a spring force.

* * * * *